(12) United States Patent
Van Der Schaar et al.

(10) Patent No.: US 8,670,539 B2
(45) Date of Patent: Mar. 11, 2014

(54) DELEGATE UNIT FOR A CONFERENCE SYSTEM, CONFERENCE SYSTEM, METHOD FOR OPERATING THE DELEGATE UNIT AND COMPUTER PROGRAM

(75) Inventors: Hans Van Der Schaar, Breda (NL); Renier Hoengens, Tilburg (NL); Jaap Grootens, Teteringen (NL)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/386,499

(22) PCT Filed: Jul. 22, 2009

(86) PCT No.: PCT/EP2009/059396
§ 371 (c)(1),
(2), (4) Date: Apr. 5, 2012

(87) PCT Pub. No.: WO2011/009483
PCT Pub. Date: Jan. 27, 2011

(65) Prior Publication Data
US 2012/0189112 A1 Jul. 26, 2012

(51) Int. Cl.
*H04M 3/42* (2006.01)
(52) U.S. Cl.
USPC .................................. 379/202.01; 370/261

(58) Field of Classification Search
USPC ..................... 379/202.01; 370/261
See application file for complete search history.

(56) References Cited

U.S. PATENT DOCUMENTS 7,499,969 B1  3/2009  van Os et al.

FOREIGN PATENT DOCUMENTS

| EP | 1686835 A1 | 8/2006 |
| EP | 1903763 A1 | 3/2008 |
| JP | 09219750 | 8/1997 |
| JP | 11341458 | 12/1999 |
| JP | 2006217593 | 8/2006 |
| WO | 2005057890 | 6/2005 |

OTHER PUBLICATIONS

PCT/EP2009/059396 International Search Report, Jan. 23, 2012.

*Primary Examiner* — Quynh Nguyen
(74) *Attorney, Agent, or Firm* — Michael Best & Friedrich LLP

(57) ABSTRACT

Conference Systems usually comprise a plurality of delegate units, whereby each delegate unit provides a speaking place for a person attending the Conference. A delegate unit (1) for a Conference System is disclosed with a microphone (4) and a signal means (6, 7, 9) whereby the signal means (9) comprise a possible-to-speak indicator (9) operable to indicate a possible-to-speak Status of the microphone (4), whereby the microphone is ready to be activated by a user of the delegate unit (1), thus indicating the user floor status.

9 Claims, 2 Drawing Sheets

Figure 1:
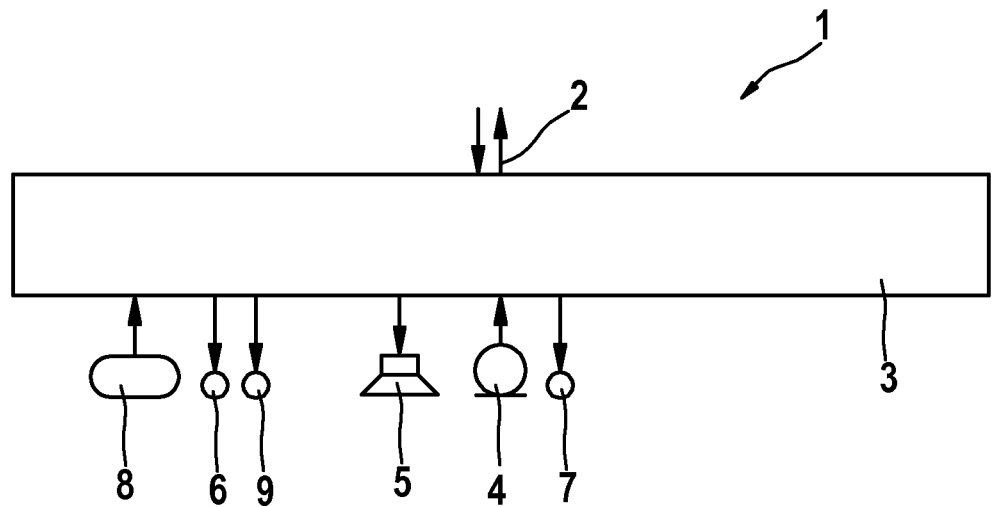

DELEGATE UNIT FOR A CONFERENCE SYSTEM, CONFERENCE SYSTEM, METHOD FOR OPERATING THE DELEGATE UNIT AND COMPUTER PROGRAM

STATE OF THE ART

The invention relates to a delegate unit for a conference system, the delegate unit comprising a microphone and a signal means. Furthermore, the invention relates to a conference system with such a delegate unit, a method for operating the delegate unit and a computer program.

Conference systems usually comprise a plurality of delegate units, whereby each delegate unit provides a speaking place for a person attending the conference. Each delegate unit comprises at least a microphone and often a loudspeaker. The microphone is used to capture the statements or contributions to the discussion of the user of the delegate unit. The loudspeaker is provided for outputting the contributions of other users of the conference system. The activation and deactivation of the microphones can be operated in several microphone management operation modes.

The document EP 1686835 1, probably representing the closest prior art, discloses a conference system with a delegate unit, whereby the delegate unit is operable to indicate states of the delegate unit for example on a microphone of the delegate unit. In one embodiment an indicator of the microphone radiates light in a first colour indicating at least one first state of the delegate unit of the conference system and said indicator radiates light in a second colour indicating at least one second state of the delegate unit of the conference system, wherein said second state of the delegate unit is different from the first state of the delegate unit. disclosure of the invention The invention discloses a delegate unit with the features of claim 1, a conference system with the features of claim 7, a method for operating the delegate unit with the features of claim 10 and a computer program with the features of claim 11. Preferred or advantageous embodiments of the invention are described by the dependent claims, the description and the figures as attached.

According to the invention a delegate unit is disclosed, which is adapted for and/or operable to be used with a conference system. The delegate unit—also called discussion or conference unit—comprises at least a microphone, which is embodied to be used by a user—also called delegate—of the delegate unit, and a signal means for indicating states of the delegate unit or components thereof. The delegate unit may be embodied and/or integrated in a desk or a console, which serves as a working place for the user during a discussion.

It is proposed that the signal means comprises a possible-to-speak indicator, which is operable to indicate a possible-to-speak status of the microphone, whereby in the possible-to-speak status the microphone is ready to be activated by the user of the delegate unit. Especially the microphone is ready to be activated immediately and/or as a direct reaction to an activation action of the user like pressing a respective button or like voice activation.

Usually, all delegates of a meeting or a discussion using a conference system do not know whether or not they are able to switch on the microphone on the respective delegate units. They can only try to switch on their microphone. In case no speaker positions are available from the conference system the microphone will remain deactivated, in case a speaker position is available, the floor will be granted and the microphone will be activated.

The new possible-to-speak indicator will inform the delegate if he or she is able to switch on the microphone at once. When the possible-to-speak indicator is off it means no one—in some embodiments except for the chairman—can switch on the microphone at that moment. When the possible-to-speak indicator is on, the microphone can be activated by the user.

The advantage of the new delegate unit is that the use is more convenient and the user receives a clear information whether or not she/he is allowed to enter into the discussion at once or she/he has to wait.

In a preferred embodiment of the invention the delegate unit comprises an interface, which is adapted to retrieve and/or to receive a possible-to-speak information, especially a signal, from the conference system, whereby the delegate unit is operable and/or adapted to activate the possible-to-speak indicator on the basis of the possible-to-speak information. In general it is possible that said signal is polled by the delegate unit or pushed by the conference system. In some embodiments the possible-to-speak information may be a digital signal, informing the delegate unit whether or not the possible-to-speak indicator shall be activated. In other embodiments the possible-to-speak information comprises an information about the number of active microphones in the conference system, whereby the possible-to-speak indicator is only activated in case the number of active microphones are smaller than a threshold or limiting value.

In a possible realization of the invention the delegate unit further comprises a delegate loudspeaker, a microphone activating switch, a microphone-on indicator of the microphone and/or a microphone-on indicator on the unit. This embodiment represents a basic delegate unit, which is sufficient for the use in the conference system. The microphone activating switch may be embodied as a button and allows the user to enable the microphone in case a speaker position is available and/or the possible-to-speak indicator is active. The microphone-on indicators shows a signal in case the microphone is enabled. One microphone-on indicator may be placed on the microphone, so that the signal can be seen by other delegates in order to show who is speaking. Another microphone-on indicator may be placed on a console of the delegate unit and informs only the user that his microphone is active.

It is especially preferred, that the basic delegate unit is used in a conference system without a request list functionality and/or in a conference system without voice activation mode as explained later on.

In a more sophisticated system, hereinafter referred as professional delegate unit, the delegate unit further comprises a request-to-speak switch, especially embodied as a button. The request-to-speak switch may also be realised as the microphone activation switch. , a request-to-speak indicator on the unit and/or on the microphone. The functionality of the request-to-speak components will be explained later on.

In a possible realization of the invention the possible-to-speak indicator and/or the microphone-on indicator is realized as a lamp. In some embodiments colour switching or multicolour lamps are used, so it is possible that the possible-to-speak indicator and the microphone-on indicator are embodied as a single colour switching or multicolour lamp. Convenient colours for the different lamps are white for the possible-to-speak indicator, red for the microphone-on indicator and/or green for the request-to-speak indicator. Other colour combinations are possible.

A further subject-matter of the present invention is the conference system comprising at least one of the delegate units as described before with the features of claim 7. Preferably, the conference system comprises a plurality of the delegate units. In one possible embodiment the delegate units are realized as basic delegate units, as described in connection with sub-claim 3. In a more sophisticated embodiment the conference system comprises the professional delegate units as described before in connection with claim 4.

In a possible embodiment the conference system provides a request list functionality, which means that the user (delegate) who wants to speak has to use a request-to-speak switch or the microphone activation switch to send a request to the conference system. In a following step the request is added to a request list of the conference system. The microphones of the delegate units are activated in the same order as their requests are arranged in the request list. In some embodiments a plurality of speakers is allowed simultaneously, so that for example the first four requests of the speakers list are granted at the same time. In case the request list is in a state that a request of a user would be granted immediately, the possible-to-speak indicator of the delegate unit is activated.

In a further preferred embodiment, the possible-to-speak indicators of all delegate units are activated in case at least one microphone of the delegate units is ready to be activated by the user of the delegate unit at once.

It is within the scope of the invention, that the conference system, especially the management of the audio signals and the audio signals themselves are embodied as digital signals. But it is also possible that the possible-to-speak signal and/or the audio signals are realized as analogue signals. In other words, the conference system is optionally realized as an analogue system.

A further subject-matter of the invention is a method for operating the delegate unit as described before wherein in a possible state the possible-to-speak indicator is deactivated, while the microphone is not available for the user and in a further possible state the possible-to-speak indicator is activated while the microphone is instantaneously, promptly and/or immediately available for the user.

A further subject-matter of the invention is a computer program with software means as explained in claim 11.

Figure 2:
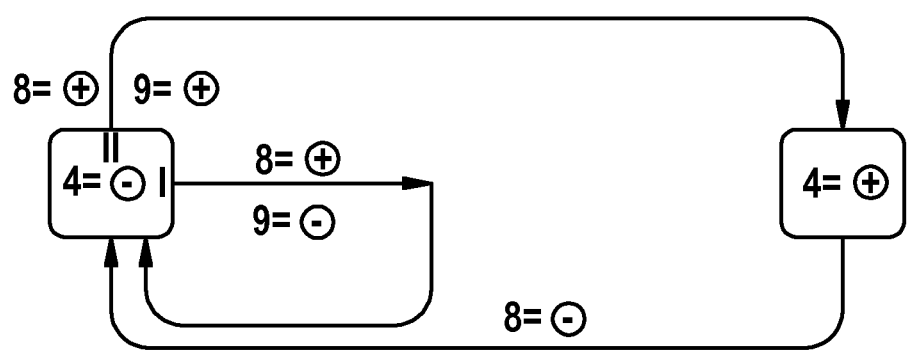
Figure 3:
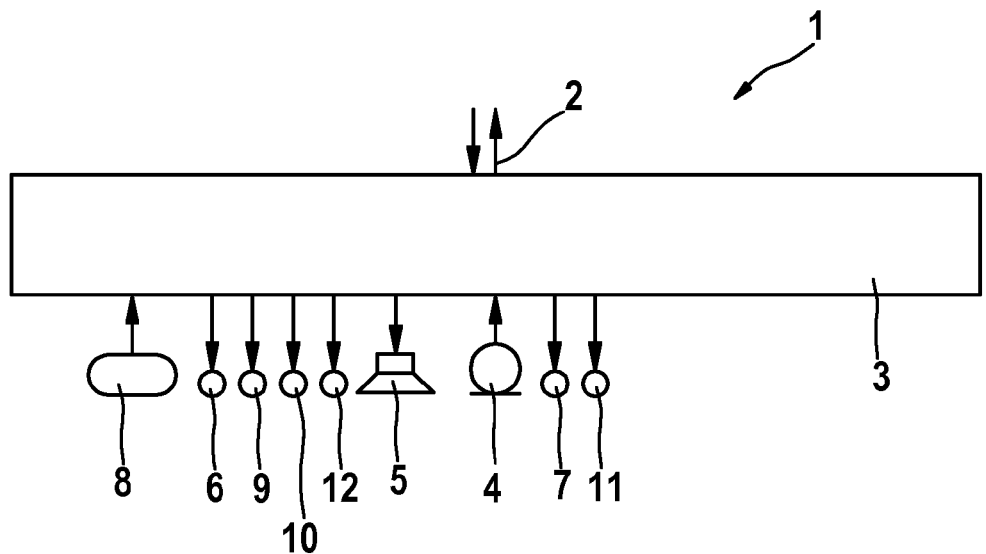
Figure 4:
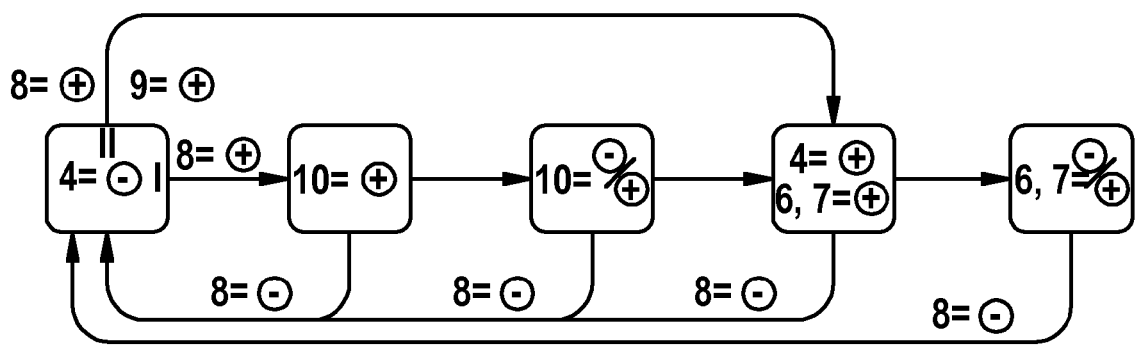

Further features, advantages and effects of the invention will become apparent by the description of preferred embodiments of the invention and the figures as attached. The figures show:

FIG. 1 a schematic view of a basic delegate unit as a first embodiment of the invention;

FIG. 2 a state diagram for the basic delegate unit in FIG. 1;

FIG. 3 a professional delegate unit as a second embodiment of the invention;

FIG. 4 a state diagram of the delegate unit in FIG. 3.

In the following same numbers designate same or corresponding parts in the drawings.

FIG. 1 shows a block diagram of a basic delegate unit 1 as a first embodiment of the invention. The basic delegate unit 1 comprises an interface 2, which is adapted to connect the basic delegate unit 1 to a conference system. The conference system may be used during political or other discussions in parliaments etc. The conference system may comprise at least one chairman delegate unit or maybe established only by delegate units 1 as shown in FIG. 1 or 3.

The basic delegate unit 1 comprises a processing device 3, which is adapted to receive information or signals from the interface 2 and/or send information or signals over the interface 2 to the conference system. Furthermore the processing device is connected with a plurality of components as follows:

A microphone 4 is provided for enabling a user to speak over the conference system. A loudspeaker 5 emits the contribution of the user of the shown basic delegate unit 1 or of another delegate or chairman unit. A first microphone-on indicator 6 is placed on the delegate unit 1, so that the user of the delegate unit 1 can observe the indicator. Another microphone-on indicator 7 is placed on the microphone 4 of the basic delegate unit 1, so that other persons of the auditorium can see the indicator 7. The indicators 6, 7 may be realized as red LEDs, which are lit or illuminated as soon as the microphone 4 is activated. Furthermore, a microphone button 8 is provided, enabling the user to activate the microphone 4.

The basic delegate unit 1 may be connected to a conference system, which operates without a so-called request list and/or without an operator or chairman.

A possible embodiment of the conference system is realized as an analogue system, whereby the audio and control signals are provided by analogue signals. Especially the processing device 3 is realized as an analogue component. In such analogue conference systems only a limited number of microphones may be activated simultaneously. Without further controls the user of the basic delegate unit 1 does not know whether his microphone 4 will be activated as soon as he uses the microphone button 8 or if he or she has to wait until the number of activated microphones is below the said limit.

For that reason a possible-to-speak indicator 9 is provided in the basic delegate unit 1, especially in the processing device 3, which is activated as soon as the user can activate his microphone 4 by pressing the button 8 immediately for example without waiting for another person to deactivate his microphone. In other words the possible-to-speak indicator 9 indicates that the user has a prompt access to the microphone 4 and thus to the floor after pressing the microphone button 8. When the possible-to-speak indicator 9 is deactivated the user knows that he has to wait until he can activate his microphone 4. The possible-to-speak indicator 9 is for example realized as a white LED.

In some embodiments a plurality or each delegate unit 1 connected to the conference system show a possible-to-speak indicator 9, which are activated simultaneously as soon as the number of activated microphones of the conference system is below a limit value.

FIG. 2 shows a block diagram illustrating the states of the basic delegate unit 1 of FIG. 1.

In a first state I the microphone 4 is idle and the possible-to-speak indicator 9 is deactivated. In case the user presses the microphone button 8 no speaker position is available and the delegate unit 1 or the microphone 4 stays in the idle state.

In a second state II the possible-to-speak indicator 9 indicates that a speaker position is available. In case the user presses the microphone button 8 the microphone 4 is activated, also the microphone-on indicators 6 and 7 are activated, for example red illuminated. The possible-to-speak indicator 9 is still white illuminated or also has changed to a red illumination.

The possible states of the delegate unit 1 are summarised as follows:

| State | indication on the unit 1 | indication on the microphone 4 |
|---|---|---|
| Idle (no microphone 4 available) | no indication | no indication |
| Idle (microphone 4 available) | possible-to-speak indicator 9 is white illuminated | no indication |
| Microphone 4 on | microphone-on indicator 6 is red illuminated | microphone-on indicator 7 is red illuminated |

In some embodiments the microphone-on indicator 6 and the possible-to-speak indicator 9 are realized within a single colour changing lamp, so that in the state I the common lamp is white illuminated and in the state II the common lamp is red illuminated.

FIG. 3 shows a block diagram of a more sophisticated delegate unit as a professional delegate unit 1 representing a second embodiment of the invention. In addition to the components of the basic delegate unit 1 of FIG. 1 the professional delegate unit 1 in FIG. 3 further comprises a request-to-speak indicator 10 on the unit and a request-to-speak indicator 11 on the microphone 4. Optionally, the professional delegate unit 1 comprises a VIP (very important person) indicator 12. The VIP indicator 12 is lit in the VIP-mode, wherein the microphone 4 is activated all the time.

FIG. 4 shows the state diagram for the delegate unit 1 in FIG. 3. In a first state I the professional delegate unit 1 is idle and the microphone 4 is not immediately available. Consequently the possible-to-speak indicator 9 is deactivated and the further indicators are also deactivated.

In a second state II the microphone 4 is available for prompt access, so that the possible-to-speak 9 indicator is activated, indicating the possible-to-speak-status. In case the delegate hits the microphone button 8, the floor will be granted at once and the microphone 4 will be activated. The delegate may speak until he uses again the microphone button 8 or until a pre-determined speech time is elapsed. In the latter case the microphone-on indicator will start flashing, indicating a last period, for example a minute, of speech time. After the last period, the microphone will be deactivated automatically or by the chairman and the delegate unit 1 will return in its idle state.

In case the delegate presses the microphone button 8 during the first state I, a request for speaking will be sent to the conference system and the request-to-speak indicator 10 will be green illuminated. As soon as the delegate is defined as a next speaker, the request-to-speak indicator 10 will start flashing. After the floor is granted, the microphone-on indicators 6 and 7 are red illuminated and the delegate may start his speech. In each phase the delegate may withdraw his request to speak by pressing again the microphone button 8. As already explained in connection with the basic delegate unit 1, the delegate may end his speech by pressing again the microphone button 8 or after his speaking time has nearly lapsed, a last period of his speech is indicated by flashing the microphone-on indicators 6 and 7.

The possible states of the delegate unit 1 are summarised as follows:

| State | indication on the unit 1 | indication on the microphone 4 |
| --- | --- | --- |
| Idle (no microphone available) | no indication | no indication |
| Idle (microphone available) | possible-to-speak indicator 9 is white illuminated | no indication |
| Request-to-speak | request-to-speak indicator 10 is green illuminated | no indication |
| Next speaker | request-to-speak indicator 10 is flashing green | no indication |
| Microphone 4 on | microphone-on indicator 6 is red | microphone-on indicator 7 is red |
| Last minute | illuminated microphone-on indicator 6 is flashing red | illuminated microphone-on indicator 7 is flashing red |
| VIP Status | microphone-on indicator 6 is orange illuminated | no indication |

The invention claimed is:

1. A delegate unit for a conference system, the delegate unit having at least one state, the at least one state including a possible-to-speak status of a microphone state, the delegate unit comprising
a microphone, the microphone configured to be activated in response to a user activation only when the delegate unit is in the possible-to-speak status of the microphone state;
a signal means including
a possible-to-speak indicator operable to indicate the possible-to-speak status of the microphone, wherein in one state the possible-to-speak indicator is deactivated, while the microphone is not available for the user and in a second state the possible-to-speak indicator is activated, while the microphone is available; and
an interface adapted to retrieve, to receive, or to retrieve and receive possible-to-speak information from the conference system, whereby the delegate unit is operable to activate the possible-to-speak indicator and change the state of the delegate unit on the basis of the said information.

2. The delegate unit according to claim 1, wherein the delegate unit further comprises at least one of the group including a delegate loudspeaker, a microphone-activating switch, a microphone-on indicator on the microphone, a microphone-on indicator on the delegate unit, and a microphone-on indicator on a console of the delegate unit.

3. The delegate unit according to claim 1, wherein the delegate unit further comprises a request-to-speak-switch, and a request-to-speak-indicator on the delegate unit, on a console of the delegate unit, or on the microphone.

4. The delegate unit according to claim 1, wherein the possible-to-speak and the request-to-speak indicators on the delegate unit are lamps.

5. The delegate unit according to claim 1, wherein the possible-to-speak indicator and the microphone-on indicator on the delegate unit or on the console are embodied as a single colour-switching lamp.

6. A conference system comprising at least one of the delegate units according to claim 1.

7. The conference system according to claim 6, wherein the possible-to-speak-signal is an analogue signal.

8. The conference system according to claim 6, further comprising a speaker list, whereby the conference system is operable to activate the possible-to-speak indicator in case the speaker list comprises at least one free list position.

9. A non-transitory computer readable medium storing a computer program comprising computer executable instructions to carry out the method according to claim 1, when the computer program is carried out on a computer or a conference system or a delegate unit.

* * * * *

UNITED STATES PATENT AND TRADEMARK OFFICE
CERTIFICATE OF CORRECTION

| | | |
|---|---|---|
| PATENT NO. | : 8,670,539 B2 | Page 1 of 1 |
| APPLICATION NO. | : 13/386499 | |
| DATED | : March 11, 2014 | |
| INVENTOR(S) | : Van Der Schaar et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 39 days.

Signed and Sealed this

Twenty-ninth Day of September, 2015

Michelle K. Lee

*Director of the United States Patent and Trademark Office*